United States Patent [19]

Norick

[11] 4,067,193
[45] Jan. 10, 1978

[54] COMBINED HYDROSTATIC TRANSMISSION IMPLEMENT SYSTEM

[75] Inventor: William B. Norick, Dunlap, Ill.

[73] Assignee: Caterpillar Tractor Co., Peoria, Ill.

[21] Appl. No.: 743,833

[22] Filed: Nov. 22, 1976

[51] Int. Cl.² ............................................. F16H 39/46
[52] U.S. Cl. ...................................... 60/445; 60/484; 60/494
[58] Field of Search ................ 60/445, 447, 484, 494, 60/465, 433, 434

[56] References Cited

U.S. PATENT DOCUMENTS

| | | | |
|---|---|---|---|
| 2,316,926 | 4/1943 | Willett | 60/421 |
| 2,941,365 | 6/1960 | Carlson et al. | 60/433 X |
| 3,533,234 | 10/1970 | Futamata et al. | 60/400 |
| 3,973,399 | 8/1976 | Van Gerpen | 60/445 |

Primary Examiner—Edgar W. Geoghegan
Attorney, Agent, or Firm—Phillips, Moore, Weissenberger, Lempio & Majestic

[57] ABSTRACT

A hydraulic system is disclosed which combines hydrostatic and implement motors and includes a plurality of hydraulic motors with a variable displacement pump supplying fluid for the motors and a plurality of directional control valves for selectively directing fluid from the pump to the respective motors and includes pressure varying means connected to each of the directional control valves for varying a pilot pressure communicated to vary the displacement of the variable displacement pump in direct relationship to the shifting of the directional control valves.

14 Claims, 1 Drawing Figure

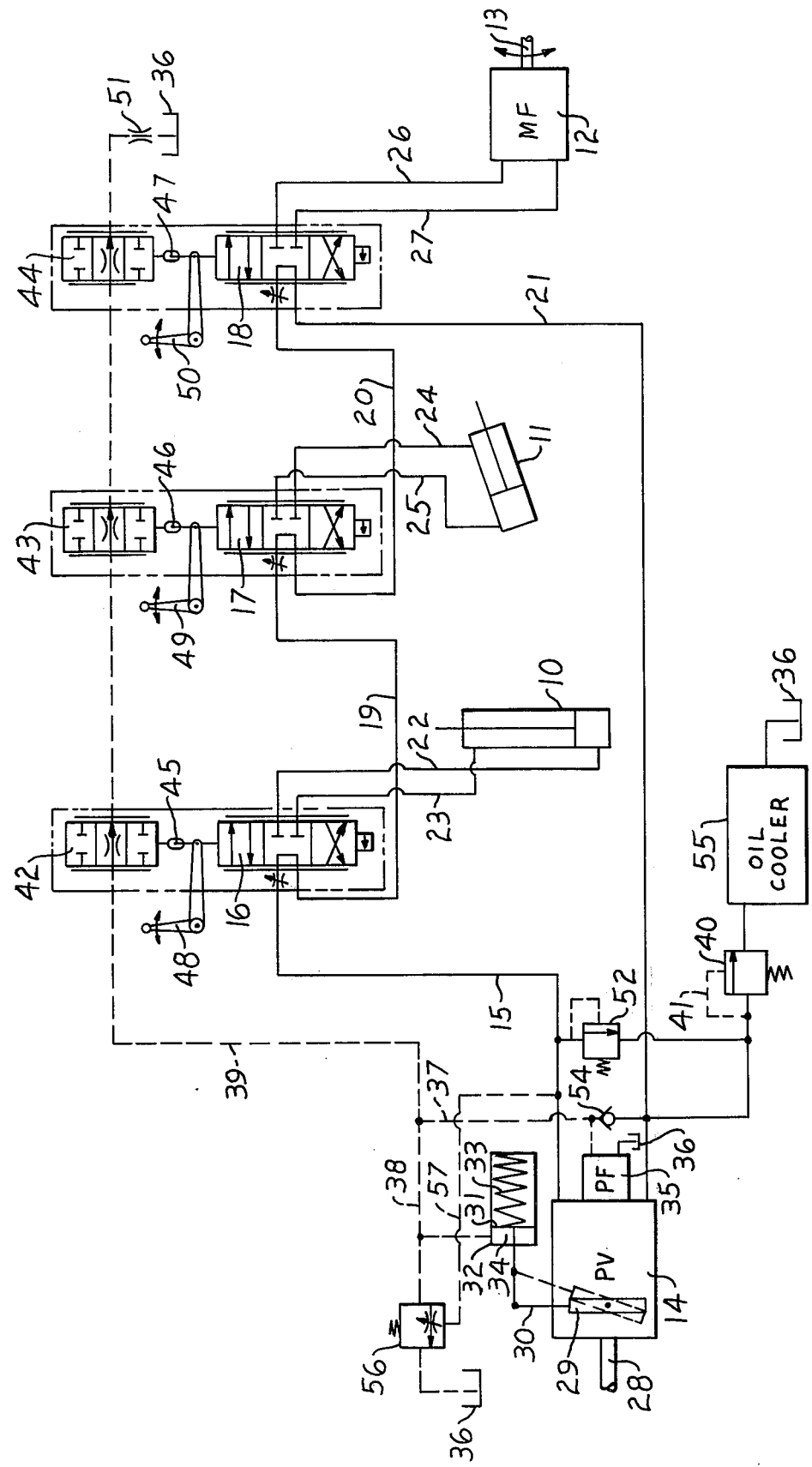

COMBINED HYDROSTATIC TRANSMISSION IMPLEMENT SYSTEM

BACKGROUND OF THE INVENTION

The present invention relates to hydraulic systems and pertains particularly to a combined hydrostatic transmission and implement control system.

Variable displacement pumps are coming into increasingly widespread use because of their high efficiency. Fixed displacement pumps normally pump a flow of fluid continuously when in operation whereas variable displacement pumps may be arranged to pump fluid only when the fluid is needed. For this reason, the use of variable displacement pumps can result in increased efficiency, considerable savings and very low loss of energy.

One disadvantage to variable displacement pumps, however, is that they are normally somewhat more complicated than fixed displacement pumps. This complication results primarily from the need for mechanisms for varying the displacement from minimum to maximum and the provision of control means for controlling this variable displacement.

Various systems for varying the displacement of hydraulic pumps are known. Most such systems, however, are too complicated and expensive for utilization in small inexpensive hydraulic systems.

SUMMARY AND OBJECTS OF THE INVENTION

It is the primary object of the present invention to overcome the above problems of the prior art.

Another object of the present invention is to provide a simple and inexpensive variable displacement control means for variable displacement pumps in hydraulic systems.

A further object of the present invention is to provide a hydraulic control system having a plurality of hydraulic motors and a variable displacement pump with variable displacement control means responsive to the direction of fluid to the respective motors for varying the displacement of the pump.

In accordance with the primary aspect of the present invention, a combined hydrostatic transmission and implement system having a plurality of hydraulic motors including a rotary hydraulic motor and a variable displacement pump is provided with throttling means operative with the directional control valves for controlling the displacement of the variable displacement pump in response to the direction of hydraulic fluid to the respective control or hydraulic motors.

BRIEF DESCRIPTION OF THE DRAWING

The above and other objects and advantages of the present invention will become apparent from the following description when read in conjunction with the drawing wherein the drawing is a schematic layout of a hydraulic system incorporating a preferred embodiment of the present invention.

DETAILED DESCRIPTION

Turning now to the drawing, there is illustrated a schematic layout of a hydraulic system embodying the present invention and basically comprising first and second linear hydraulic motors 10 and 11 and a rotary hydraulic motor 12 for powering the driving wheels or the like of a vehicle.

The present circuit is designed for vehicles such as a lift truck or the like wherein one or the other of motor 10 and 11 may be the lift or tilt cylinders of the vehicle whereas the other motor may be the tilt cylinder and the motor 12 the translation motor or the like.

A variable displacement pump 14 supplies fluid by way of a supply conduit 15 to a series of pressure compensated directional flow control valves 16, 17 and 18, each respectively connected for directing pressurized fluid to motors 10, 11 and 12. In the illustrated embodiment, the valves 16, 17 and 18 are connected in a true series fashion such that the outlet from valve 16 by way of conduit 19 becomes the inlet to valve 17 and the outlet from valve 17 by way of conduit 20 becomes the inlet to valve 18. It is also obvious that the valves could be connected in a parallel relationship with pump 14. In this arrangement, two or more valves can be operated simultaneously without one affecting any other. In this embodiment the outlet from valve 18 by way of conduit 21 becomes the return conduit back to the inlet of pump 14.

With this arrangement, when all valves are simultaneously fully actuated, the first motor will be the first to move and the exhaust flow will be available to the second valve, etc. The pressure required for each circuit is additive to total pump operating pressure.

It will also be appreciated from the illustrated circuit that the outlet from each respective motor is communicated to the outlet of the valve and the inlet to the next downstream valve. The valve 16, for example, directs pressurized fluid by way of motor control line 22 and 23 to motor 10. When fluid is being supplied to the motor by way of one of the lines 22 or 23, fluid is simultaneously being exhausted by way of the other of said lines by way of valve 16 to the outlet conduit 19 which becomes the inlet to valve 17.

Valve 17 similarly communicates or directs fluid by way of lines 24 and 25 to the motor 11. Valve 18 functions in a similar manner to direct fluid by way of motor control lines 26 and 27 to and from the reversible fixed displacement motor 12.

The variable displacement pump 14 is driven by suitable prime mover means not shown through a drive shaft 28. The pump is of the variable displacement type such as axial piston swash plate type having a swash plate 29 tiltable from a minimum displacement position as shown to a maximum displacement as shown in phantom. The swash plate is connected by suitable linkage means 30 to an actuating mechanism such as a piston 31 within a cylinder 32. Spring means 33 act on the piston 31 to bias the swash plate to the minimum displacement position whereas fluid under pressure acting on the side of piston in chamber 34 biases the swash plate to the maximum displacement position.

This piston cylinder assembly comprises pressure responsive variable displacement means for varying the displacement of the pump. Pressure for varying the displacement of the pump is supplied by means of a fixed displacement pump 35 which draws fluid from sump 36 and supplies it by way of a pilot fluid supply line 37 which branches with a branch 38 going to the chamber 34 of piston cylinder means 31, 32 and a branch 39. The line 37 is also in communication with the line 21 for the purpose of precharging and supplying make-up fluid for the inlet of pump 14.

The branch line 38 is in constant open communication with chamber 34 of cylinder 32, thus fluid pressure therein always acts on the face of piston 31 such that the displacement of piston 31 depends upon the pressure of the fluid within the chamber 34. A pilot operated relief valve 40 set to a value of approximately 150 PSI relieves fluid from lines 37, 38 to tank 36. This pilot operated relief valve is pilot operated through a line 41.

The fluid supplied by way of branch conduit 39 is in normal open but restricted communication to tank 36. The pressure within this line, however, is varied by pressure varying means comprising a plurality of modulating or throttling valves 42, 43 and 44 connected respectively to the directional control valves 16, 17 and 18. These valves are each infinitely variable or infinitely modulable or modulating, meaning that they are capable of changing the flow rate therethrough over a wide range of movement from full open flow to completely blocking the flow. Thus, the restriction of the valve causes a buildup in pressure in line 39 and a communication of that pressure to the piston 31 and consequent actuating of the piston or displacement varying means of the variable displacement pump 14.

Each of the modulating valves 42, 43 and 44 are respectively connected by suitable linkage means to each of the respective valves. This linkage means includes lost motion link means 45, 46 and 47, respectively, which permits the respective directional control valve 16, 17 and 18 to move in either direction a predetermined amount prior to initiation of movement of the respective modulating pilot valve 42, 43 or 44. The term lost motion link or linkage, as used herein, is intended to mean in its usual sense a linkage which permits a driving member to move over a predetermined distance prior to engagement and movement of the driven member. This is the usual definition of lost motion linkage means and is so used herein. It is also apparent that the modulating valve could be an integral part of the main control valve spool wherein the timing between the main spool slots and the modulating slots allows the cylinder port to open prior to pump increasing displacement. The linkage for each of the valves 16, 17 and 18 also includes a manual control lever 48, 49 and 50 respectively, connected to each of the valves for manually shifting the respective valve. The pilot passage 39 includes suitable restriction means 51 which applies such sufficient restriction therein to maintain a minimum pilot pressure within the lines 37, 38 and 39 at all times.

Upon shifting of any one of valves 16, 17 or 18, a predetermined distance for directing fluid to any one of the respective motors, the respective ones of the modulating pilot valves 42, 43 and 44 will begin to move and begin to restrict the substantially open communication of fluid by way of line 39 to sump 36. This restriction of the flow of fluid to sump 36 will cause a buildup of pressure within line 39 and a consequent communication of that increased pressure to piston 31 resulting in a movement of the piston toward the maximum displacement position of the pump 14. Thus, upon shifting of any one of the valves 16, 17 and 18 sufficient distance to begin causing a restriction in the pilot pressure line, the displacement of pump 14 will begin to increase to supply an increasing amount of fluid to the supply line 15 and the respective valves 16, 17 and 18. Upon continued movement of any one of the respective valves, the communication of pilot pressure by way of line 39 will be further restricted and cause a further increase in pressure in branch line 38 and chamber 34 in a further movement of the piston 31 toward the maximum displacement position. Thus, upon full shifting of any of the valves for a complete cutoff of communication of line 39 and sump 36, full pressure will be applied to piston 31 and the pump 14 will be biased to its full displacement position supplying maximum fluid by way of conduit 15 to the respective valves 16, 17 and 18 for directing fluid to the motors 10, 11 and 12. Because the modulating valves are arranged in a series relationship, the pressure created by each modulating valve would be additive, thus creating a combined pressure in lines 38, 39 and chamber 32 for controlling pump 14 displacement relative to system demands.

This system, of course, includes the usual relief valves 52 and 40 and a check valve 54 for protecting the system against overpressurization and a suitable oil cooler 55. An unloading valve 56 is provided within the pump control line 38 for controlling pump flow in response to system pressure. The pilot line senses system pressure and causes unloading valve 56 to relieve pressure in line 38, thus allowing pump 14 to reduce displacement prior to relief valve 52 opening. This reduces energy loss due to large flow rates across relief valve 52.

While the present invention has been described with respect to a specific embodiment, it is to be understood that numerous changes may be made therein without departing from the spirit and scope of the invention as defined in the appended claims.

What is claimed is:

1. A hydraulic system comprising a plurality of hydraulic motors, a variable displacement pump for supplying pressurized fluid for operation of said motors and a plurality of directional control valves for selectively directing pressurized fluid from said variable displacement pump to said hydraulic motors, the improvement comprising:
    pressure responsive variable displacement means for varying the displacement of said pump;
    a source of pressurized fluid communicating with said variable displacement means; and,
    pressure varying means connected to at least one of said directional control valves for varying the pressure of said source of pressurized fluid in response to movement of said one of said directional control valves for varying the displacement of said variable displacement pump, wherein said pressure varying means comprising separate and discrete throttling means for variably restricting the flow of said fluid via said conduit means to said sump.

2. The hydraulic system of claim 1 wherein:
    said source of pressurized fluid comprises a fixed displacement pump; and,
    conduit means communicating the outlet of said pump with said pressure responsive variable displacement means and with a sump.

3. The hydraulic system of claim 1 comprising timing means between said throttling valve means and said directional control valve to provide that the directional control valve opens said pump to said actuator prior to said throttling valve means restricting the flow of said fixed displacement pump.

4. The hydraulic system of claim 3 wherein said timing means includes lost motion connecting means for connecting said throttling valve means to said one valve.

5. The hydraulic system of claim 1 wherein said variable displacement pump is a swash plate pump;
    said variable displacement means includes spring means for biasing said swash plate to a minimum displacement position; and, piston means for biasing said plate to a maximum displacement position.

6. The hydraulic system of claim 5 wherein said plurality of valves are connected in a true series connection wherein the outlet from one of said valves is communicated to the inlet to the next valve downstream thereof.

7. The hydraulic system of claim 6 wherein said system comprises a pair of linear hydraulic motors and a rotary hydraulic motor, and said rotary hydraulic motor is downstream of said linear motors.

8. The hydraulic system of claim 5 wherein said throttling valve means is connected to each of said directional control valves.

9. The hydraulic control system of claim 8 wherein said throttling valve means is infinitely variable.

10. The hydraulic control system of claim 9 including manual control lever means for shifting said directional control valves.

11. The hydraulic control system of claim 10 comprising timing means between said throttling valve means and said directional control valves to provide that the directional control valves open said pump to said actuator prior to said throttling valve means restricting the flow of said fixed displacement pump.

12. The hydraulic control system of claim 11 including lost motion means for connecting said throttling valve means to said directional control valves.

13. The hydraulic control system of claim 12 including pilot controlled unloading valve means for controlling the maximum pressure of said fixed displacement pump in response to a first predetermined pressure of said variable displacement pump.

14. The hydraulic control system of claim 13 including a pilot actuated relief valve for maintaining a second predetermined pressure of said variable displacement pump.

* * * * *